July 31, 1945.   H. A. BRIGDEN   2,380,721
FERTILIZER CARTRIDGE
Filed Sept. 27, 1941

INVENTOR
HOBART A. BRIGDEN
BY
Wheeler, Wheeler & Wheeler
ATTORNEYS.

Patented July 31, 1945

2,380,721

UNITED STATES PATENT OFFICE 2,380,721

FERTILIZER CARTRIDGE

Hobart A. Brigden, Milwaukee, Wis.

Application September 27, 1941, Serial No. 412,672

2 Claims. (Cl. 47—1)

My invention relates to improvements in fertilizer cartridges and methods of use thereof in horticulture.

The object of my invention is to provide a fertilizer cartridge insertable into the soil adjacent the roots of growing plants and to so construct the cartridge as to provide not only the structural strength necessary to proper insertion of the cartridge into the soil, but also to provide an envelope or container for the fertilizer material which will insure adequate but slow provision of fertilizer chemicals to the roots of the plant.

Another object of my invention is to provide a tool for use in inserting my cartridges under certain conditions where manual insertion would be impractical.

In the drawing.

Like parts are identified by the same reference characters throughout the several views.

Figure 1:
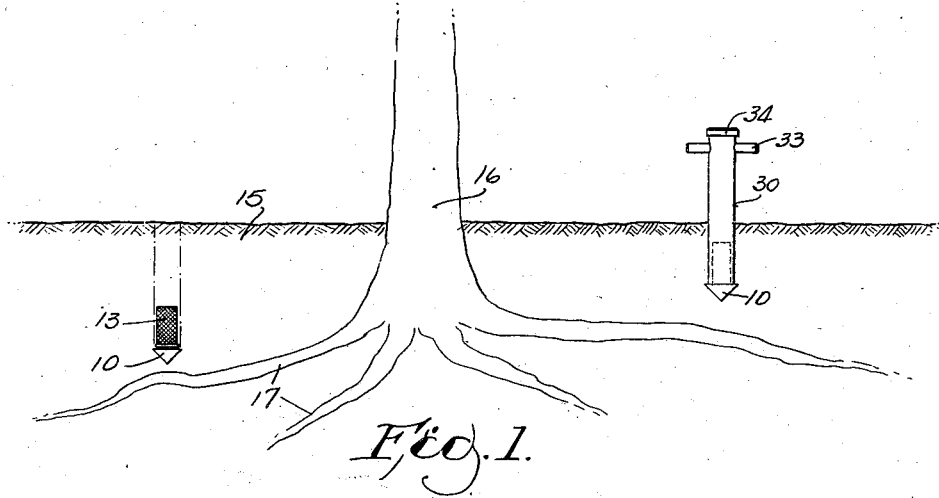
Figure 1 is a diagrammatic view, generally in vertical section, and showing portions of a tree both above and below the surface of the ground, and showing at one location adjacent the roots of the tree one of my fertilizer cartridges, and in another location my tool in an intermediate stage of insertion of a fertilizer cartridge into the soil adjacent the roots of a tree.

I am aware that provision has heretofore been made for incorporating chemicals or other substances beneficial to plants in the form of sticks which have been previously soaked or otherwise impregnated with other chemical substances and which in and of themselves are form sustaining so that they may be driven into the ground by means of a mallet. But my invention includes structures, as shown in the drawing, which will provide a container or envelope for recognized and approved fertilizer substances which are not form sustaining in themselves, and they, in granular or other relatively soft substances, may be placed in my cartridge and either inserted manually in the ground or inserted therein by means of the tool which I have shown in the drawing. My cartridge has characteristics such as to withstand physical requirements of manual or tool insertion, and at the same time provide a protected soft and permeable envelope so that fertilizer substances adapted to be passed by solution through the envelope may reach the roots of the plants to be benefited.

Figure 2:
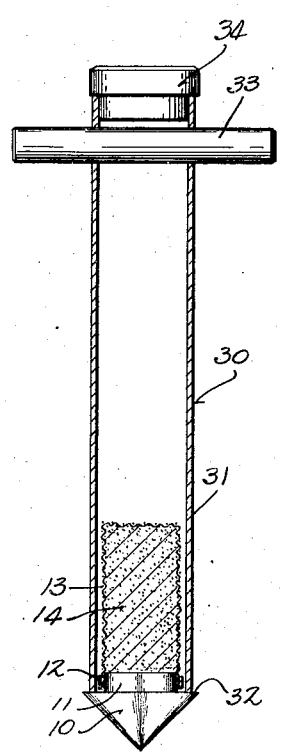
Figure 2 is a vertical section through my tool and one form of my fertilizer cartridge.

Referring first to the various forms of fertilizer cartridges embodying my invention, it will be seen in Figure 2 that I have provided a conically shaped point 10 with a short cylindrical boss 11 therebehind. About this boss 11 and clamped thereto by a contractile band 12, I provide a sack 13 of water permeable fabric-like material to form a container for fertilizer 14. This cartridge, including the parts 10 to 13 inclusive, is adapted to be inserted in the soil 15 in which vegetation such as a tree 16 may be growing, as shown in Figure 1.

The cartridge, depending upon the nature of the fertilizer or plant food contained in the sack 13, may be thrust into the soil to any suitable depth, either immediately adjacent roots 17 of the growing vegetation, or merely in general approximation so that the plant may be fed either by direct contact of the root against the sack and into the mass of fertilizer 14, or water may seep through the soil, through the sack, through the fertilizer and to the roots in the vicinity of the sack for the plant feeding operation.

One alterative form of cartridge may include a similar point 101 and cylindrical boss 110 with a metal, plastic, or other form-sustaining container 130, through which many apertures 131 may be made so that seepage of water or other solvent for the contained fertilizer 14 may pass so as to carry the fertilizer in solution out of the cartridge and into available relation to the roots of a plant.

Figure 3:
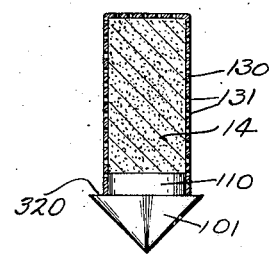
Figure 3 is a vertical section through an alternative form of cartridge made of form-sustaining material.

A cartridge of the type shown in Figure 2, or the type shown in Figure 3, may be inserted in the soil 15, by means of a tool hereinafter to be described.

The tool shown in Figure 2 is especially usable where the cartridge is non-form sustaining, as, for instance, where the fabric-like container 13 is filled with soft or granular fertilizer substance. Such a cartridge is inserted into the lower opening of a tubular portion 31 of tool 30, as shown in Figure 2. The lower margins of the tube 31 bear upon the shoulder 32 of the point 10, and the non-form-sustaining fertilizer and fabric-like container are protectively housed within the tube 31. At the upper end of the tube 31 I provide a crosswise disposed handle 33, to be used in manually forcing the tube 31 into the soil as indicated in Figure 1. If the soil is hard and resistant to penetration, a driving head 34 on the top of the tube may be used to receive the blows of a mallet or other suitable instrument to drive the tube and the cartridge into the soil.

When penetration of the soil to a sufficient depth has been accomplished, the handle 33 may be used to withdraw the tubular portion of the tool, and the wide shoulder 32 upon the point 10 will prevent the withdrawal of the cartridge, since the outer margins of the shoulder 32 will engage the soil and permit the withdrawal of the tube separately. This same tool may be used in the same way to insert the cartridge shown in Figure 3, since shoulder 320 of this cartridge is similarly wide so as to provide a bearing for the end of the tube 31 and to engage the soil as above described.

I claim:

1. A fertilizer cartridge comprising as a prefabricated unit a point adapted to be inserted under pressure in the earth, said point being of tapering form and having at its rear end a shoulder providing a shank of reduced diameter, a container connected with the shank and materially smaller in cross section than the maximum cross section of the point at said shoulder, whereby to be protected by said point and shoulder during pressure insertion of the point and container into the earth and to afford room for engagement of said shoulder externally of said container by a driving tool, and a charge of fertilizer in the container, said container having a moisture permeable wall.

2. A fertilizer cartridge comprising as a prefabricated unit a point of downwardly tapering form adapted to be inserted under pressure in the earth and having a shoulder at its upper perimeter, a container extending upwardly from the upper end of the point and materially smaller in cross section than the point at said shoulder and spaced within the perimeter of the point at said shoulder, means connecting the container with the point, and a charge of fertilizer within the container and held thereby to said point, the shoulder of said point being engageable by a driving tool externally of the container for forcing the point and container into the earth, the container having a moisture permeable wall.

HOBART A. BRIGDEN.